United States Patent [19]

Futer

[11] 4,392,760
[45] Jul. 12, 1983

[54] SURFACE FLOW AIR CONVEYOR WITH PLENUM MOUNTED FAN WHEEL

[75] Inventor: Rudolph E. Futer, Oakland, Calif.

[73] Assignee: Futerized Systems, Inc., Hayward, Calif.

[21] Appl. No.: 386,512

[22] Filed: Jun. 9, 1982

Related U.S. Application Data

[63] Continuation of Ser. No. 239,366, Mar. 2, 1981, abandoned, which is a continuation of Ser. No. 80,076, Sep. 28, 1979, abandoned.

[51] Int. Cl.³ .............................................. B65G 51/02
[52] U.S. Cl. ......................................................... 406/88
[58] Field of Search ................. 406/88, 89, 86; 34/10, 34/57; 104/155; 226/97

[56] References Cited

U.S. PATENT DOCUMENTS

| | | | |
|---|---|---|---|
| 545,013 | 8/1895 | Dodge | 406/88 |
| 2,678,173 | 5/1954 | Phelps | 226/97 X |
| 3,131,974 | 5/1964 | Futer | 406/86 X |
| 3,180,688 | 4/1965 | Futer | 406/88 |
| 3,266,848 | 8/1966 | Pitkanen | 406/86 |
| 3,267,585 | 8/1966 | Futer | 34/20 |
| 3,394,463 | 7/1968 | Futer | 34/10 |
| 3,418,724 | 12/1968 | Futer | 34/10 |
| 3,435,536 | 4/1969 | Tiwley | 34/57 |
| 3,555,693 | 1/1971 | Futer | 34/1 |
| 3,586,382 | 6/1971 | Pitkanen | 406/86 |
| 3,647,266 | 3/1972 | Hurd | 406/88 |
| 3,734,567 | 5/1973 | Fong | 406/88 |
| 3,890,011 | 6/1975 | Futer | 406/88 |
| 3,980,024 | 9/1976 | Futer | 104/155 |
| 4,078,498 | 3/1978 | Futer | 104/155 |

OTHER PUBLICATIONS

Bulletin 724-R, The New York Blower Co. pgs. 2-20-1972.
Bulletin Sqpf-107 Chicago Blower Corp. pgs. 2-3-1978.

*Primary Examiner*—Jeffrey V. Nase
*Assistant Examiner*—Gene A. Church

[57] ABSTRACT

A surface flow air conveyor pressurized by a motor driven open wheel fan mounted within the plenum or in a separate pod housing attached to the plenum. The standard scroll housing is eliminated and the fan wheel draws air directly through an opening in the plenum without the use of ducts. The fan wheel is mounted between the ends of the conveyor rather than beyond the ends of the conveyor. The conveyor may be divided into mass produced modules with the option of providing a fan wheel pod in selected modules.

2 Claims, 5 Drawing Figures

SURFACE FLOW AIR CONVEYOR WITH PLENUM MOUNTED FAN WHEEL

This application is a continuation of application Ser. No. 06/239,366, filed Mar. 2, 1981, now abandoned, which was a continuation of application Ser. No. 80,076, filed Sept. 28, 1979, now abandoned.

BACKGROUND OF THE INVENTION

It is standard state of the art practice to provide a scroll housing around wheel fans to increase the efficiency of the fan in providing directional air flow. See for example, Brown, U.S. Pat. No. 3,060,590, Oct. 30, 1962.

The use of scroll housings around wheel fans was so widely accepted that the identical structure was adopted by applicant and others in the construction of surface flow air conveyors. Some examples of patented surface flow air conveyors using scroll-housed wheel fans follows:

PATENTS - USA

| U.S. Pat. No. | GRANT DATE: | TITLE: |
|---|---|---|
| 3,131,974 | May 5, 1964 | AIRLIFT CONVEYING OF SOLID OBJECTS |
| 3,180,688 | April 27, 1965 | AIRLIFT CONVEYING OF SOLIDS |
| 3,267,585 | August 23, 1966 | CHANGING THE TEMPERATURES OF OBJECTS BY GAS JETS |
| 3,304,619 | Feb. 21, 1967 | METHOD & MEANS FOR CHANGING THE TEMPERATURE OF GRANULAR MATERIALS BY GAS JETS |
| 3,394,463 | July 30, 1968 | ALTERING THE TEMPERATURE OF GAS CURRENTS |
| 3,418,724 | Dec. 31, 1968 | METHOD & APPARATUS FOR SUBJECTING MATERIAL TO CONDITIONING GAS WITH WHIRLING MOTION |
| 3,435,536 | April 1, 1969 | DISCHARGING PARTICULATE MATERIAL FROM STORAGE MEANS, J. W. TINLEY |
| 3,555,693 | Jan. 19, 1971 | METHOD & APPARATUS FOR TREATING PIECES OF MATERIAL BY MICROWAVE |
| 3,586,382 | June 22, 1971 | TRANSPORTATION SYSTEM |
| 3,647,266 | March 7, 1972 | VELOCITY CONTROL SYSTEM FOR AIR CONVEYORS |
| 3,734,567 | May 22, 1973 | AIR CONVEYOR FOR FLAT THIN ARTICLES |
| 3,890,011 | June 17, 1975 | SUPPLY OBJECTS FROM AN AIR-FILM CONVEYOR RAPIDLY & INTERMITTENTLY TO A MACHINE |
| 3,980,024 | Sept. 14, 1976 | AIR PROPELLED VEHICLE TRANSPORTATION SYSTEM |
| 4,078,498 | March 14, 1978 | SINGLE POWER UNIT AIR PROPELLED SYSTEMS |

Open wheel fans are manufactured by Chicago Blower Corporation and recommended for use in ovens, dryers, and kilns or penthouses in panel walls, ceilings or floors. See Bulletin Sqpf-107, August, 1978. Another manufacturer of open wheel fans, which are also known as plug fans is The New York Blower Company. See undated Bulletin 724-R which suggest that the wheel and inlet cone be mounted within the plenum in special applications. Typical applications shown on Page 20 of the Bulletin indicate the advantages of using plug fans in systems in which air is recirculated within a closed plenum enclosure.

None of the prior art systems known to applicant indicate that an unhoused wheel fan could be used in the construction of surface flow air conveyors.

SUMMARY OF THE INVENTION

The gist of the present invention is the use of an open wheel fan mounted in the plenum of a surface flow air conveyor.

An object of the present invention is to reduce the cost of constructing surface flow air conveyors through the use of less parts and smaller motors and fans.

A further object of the present invention is to reduce power consumption by using smaller electric motors.

Still another object is to reduce shipping costs by reducing the weight of the conveyor and motor and constructing the unit in a more compact form.

A further object is to reduce the size of the conveyor structure so that the unit can be installed in a smaller space.

Another object is to provide a new configuration for the conveyor system so that the conveyor modules can be mass produced rather than custom made for each installation.

Still another object is to provide a system in which additional power units can be easily added or subtracted as conveyor requirements change.

DESCRIPTION OF THE PREFERRED EMBODIMENTS

Figure 1:
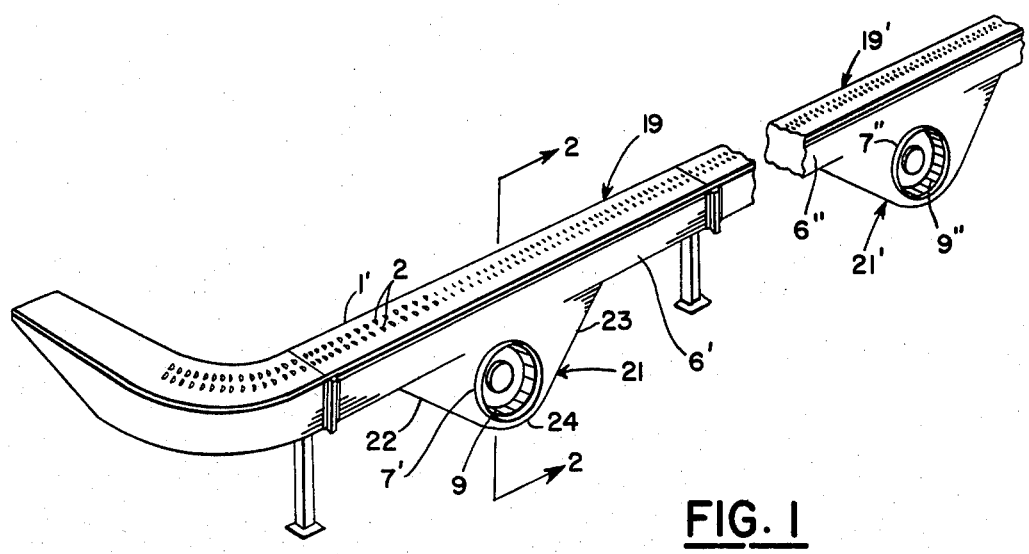
FIG. 1 is a perspective view of a portion of a surface flow air conveyor constructed in accordance with the present invention.

The surface flow air conveyor of the present invention consists of a sheet metal or plastic elongated conveying surface 1 formed with Coanda-effect directional slit orifices 2 as described in Futer, U.S. Pat. No. 3,980,024, Sept. 14, 1976, which include a series of slit openings 3 and sloping air ramps 4. The conveying surface may be formed with openings of various shapes so long as there are sufficient Coanda-effect directional slit orifices to give a horizontal directional component to the moving air to propel objects along the conveyor.

An elongated plenum 6 is co-extensive and communicates with the conveyor and is formed with a supply-air inlet opening 7. The inlet opening may be provided with an annular ring 8 to smoothly channel supply air through the opening.

A wheel fan 9 such as the airfoil wheel manufactured by Chicago Blower Corporation or the plug fans manufactured by the New York Blower Company is mounted within the plenum adjacent the supply-air inlet opening 7. An electric motor 10 turns the wheel mounted on shaft 11 journaled in bearings 12 mounted in wall 13.

Figure 4:
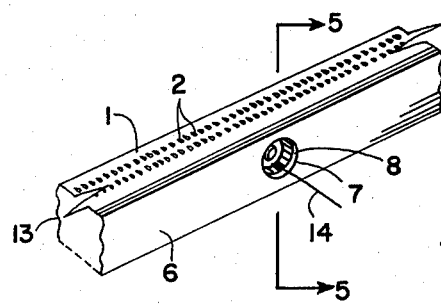
FIG. 4 is a portion of an alternate form of the invention.
Figure 5:
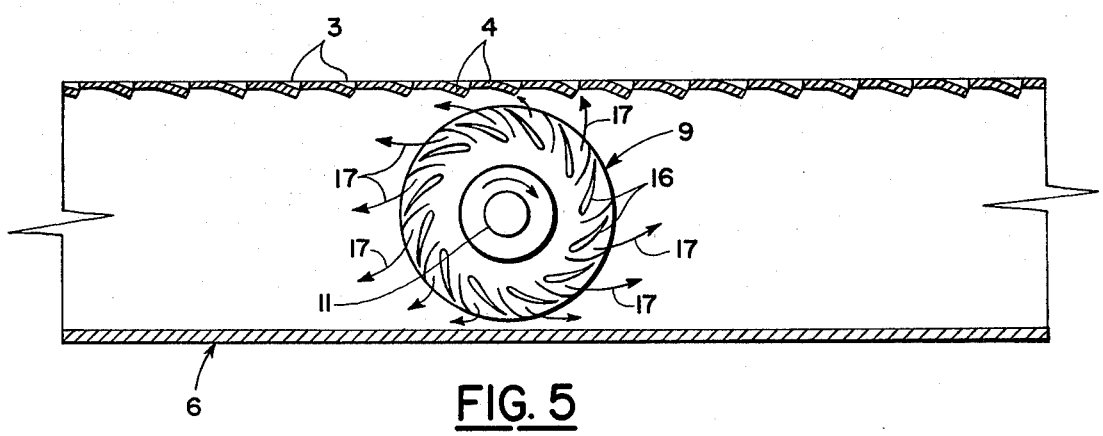
FIG. 5 is a cross section of the conveyor shown in FIG. 4 taken along line 5—5.

In one form of the invention, fan wheel 9 is mounted in a rectangular plenum 6 as shown in FIGS. 4 and 5. Air flow moves through opening 7 in the direction of arrow 14; changes direction by 90 degrees and is radially propelled from the wheel between the blades 16 in the direction of arrows 17. Note that air is driven "upstream" as well as "downstream" in the plenum.

Figure 2:
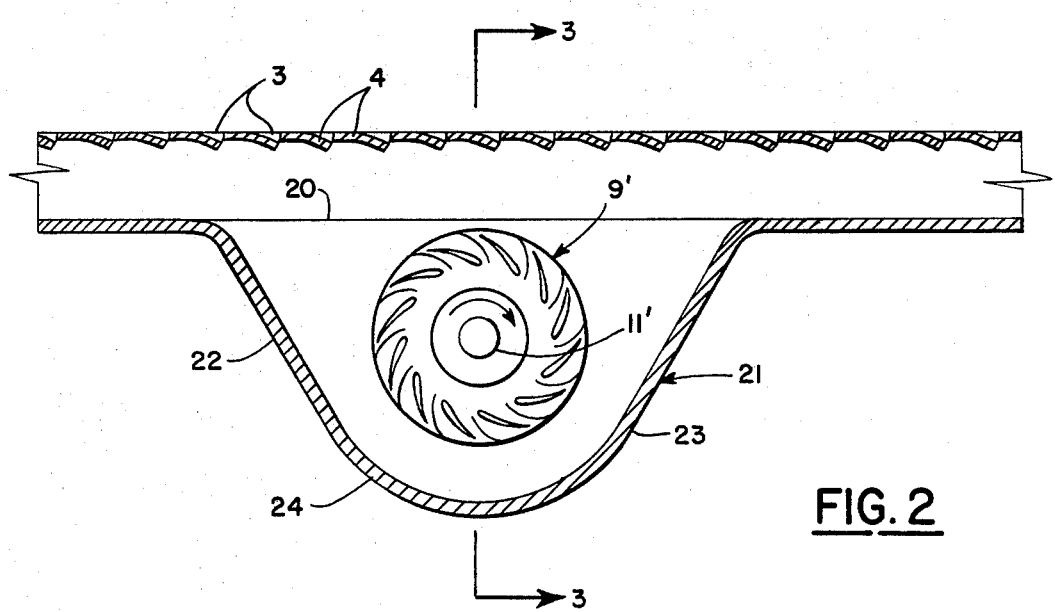
FIG. 2 is a cross sectional view of the conveyor taken generally along line 2—2 of FIG. 1.
Figure 3:
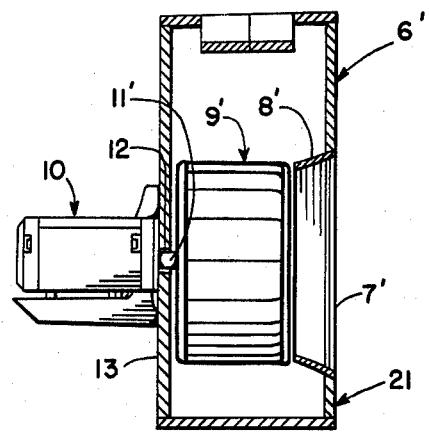
FIG. 3 is a cross sectional view of the conveyor taken generally along line 3—3 of FIG. 2.

The preferred form of the invention is illustrated in FIGS. 1-3 wherein an elongated conveyor module 19 is formed with the same Coanda-effect directional slit orifices as illustrated in FIGS. 4 and 5 in the conveying surface 1'. An elongated plenum 6', having a generally smaller cross section than the plenum illustrated in FIG. 4 communicates with the conveying surface and is formed with a pod opening. The pod opening and pod housing permit supply-air pressurized by the fan to move upstream as well as downstream of the conveyor.

A fan wheel 9' as previously described is mounted on shaft 11' within the pot housing adjacent the air-supply opening 7'. An annular ring 8' may be used in channel in-take air. The pod housing may have various configurations such as square, triangular or curvilinear. The housing shown in FIGS. 1 and 2 is simply suggestive of one form the pod housing may take.

The pod housing may be constructed from a single sheet metal member having straight portions 22 and 23 joined by a curved portion 24. The use of a pod housing permits the use of a plenum of smaller cross section; thus reducing the size and weight of the conveyor.

The use of pods also permits the plenums to be mass produced in modular sections. The pod housing, fan wheel and motor are then added to selected plenum modules depending upon the power needs of the conveyor. Thus several pod housings and wheel fans could be added to selected plenums if the conveyor is very long or an unusually high air pressure is required throughout selected portions of the conveyor.

Conventional wisdom taught that scroll housings should be used in connection with wheel fans to obtain maximum outlet pressure. Conventional wisdom also taught that open wheel fans should only be used where space design requirements prevented the mounting of scroll housings outside the plenum. It was found, however, that in surface flow air conveyors, mounting an open wheel fan within the plenum instead of mounting a wheel fan in a scroll housing outside the plenum resulted in an increase in pressure from 1.9 inches of water gauge to 2.4 inches of water gauge in one example test installation. Following this new and surprising and seemingly contradictory result, other surface flow air conveyors have been built with the same surprising increase in air pressure.

An unexpected advantage of finding that a plenum mounted fan wheel was more efficient than an externally mounted fan with a scroll housing was the realization that surface flow air conveyors could now be mass produced in modular sections. As shown in FIG. 1 several modules may be constructed and connected together. Where the conveyor is very long, or the air pressure needs to be boosted, a second conveyor module 19' with another pod housing 21' can be attached to the plenum 6''. An additional inlet opening 7'' in the pod housing permits air to be drawn in by the fan wheel 9'' which is used to pressurize the plenum.

I claim:

1. An air conveyor for elevating and moving objects longitudinally along said conveyor comprising:
   a. an elongated conveyor member formed with a plurality of directional slit orifices extending substantially evenly spaced there along and substantially the entire length of said elongated conveyor member;
   b. an elongated plenum having a bottom wall and sidewalls immediately adjacent to and co-extensive and communicating with said conveyor member and having upstream and downstream ends and formed with a circular supply-air inlet opening in one of said sidewalls having a diameter less than the width of said sidewall;
   c. a high performance wheel fan member for pressurizing said plenum totally enclosed within said plenum member and mounted in communication with said supply-air inlet opening.

2. An air conveyor for elevating and moving objects longitudinally along said conveyor comprising:
   a. an elongated conveyor member formed with a plurality of directional slit orifices extending substantially evenly spaced there along and substantially the entire length of said elongated conveyor member;
   b. an elongated plenum having a bottom wall and sidewalls immediately adjacent to and co-extensive and communicating with said conveyor member and having upstream and downstream ends;
   c. an elongated opening formed in a portion of said bottom wall of said plenum having an upstream end and a downstream end and substantially co-extensive with said sidewalls of said plenum;
   d. a fan wheel housing having a bottom wall with an upstream end connected to said upstream end of said opening, a mid bottom wall portion projecting away from said opening and a downstream end connected to said downstream end of said opening, and fan wheel sidewalls joining said wheel housing bottom wall and said sides of said elongated opening in said plenum and formed with a circular supply-air inlet opening in one of said wheel housing sidewalls;

a high performance wheel fan member for pressurizing said plenum totally enclosed within said fan wheel housing and mounted in communication with said supply-air inlet opening;

said opening in said portion of said bottom wall of said plenum has a length greater than the diameter of said wheel fan; and g. said wheel fan member is located with respect to said conveyor member so as to direct air flow upstream as well as downstream in said plenum.

* * * * *